United States Patent [19]
Meckstroth

[11] 3,986,535
[45] Oct. 19, 1976

[54] SYSTEM AND APPARATUS FOR THE PRODUCTION OF SPARKLING WINE

[76] Inventor: Charles V. Meckstroth, 3921 Bramford Road, Columbus, Ohio 43220

[22] Filed: June 19, 1974

[21] Appl. No.: 480,684

[52] U.S. Cl. ............................... 141/113; 141/64; 141/329
[51] Int. Cl.² ............................................ B65B 3/04
[58] Field of Search ................. 141/5, 64, 329, 113; 426/477; 215/247

[56] References Cited
UNITED STATES PATENTS

| | | | |
|---|---|---|---|
| 1,336,720 | 4/1920 | Baulig | 426/477 X |
| 2,289,677 | 7/1942 | Perelson | 215/247 |
| 2,723,790 | 11/1955 | Spiess et al. | 141/64 X |
| 2,757,843 | 8/1956 | Smith | 141/5 |
| 2,927,028 | 3/1960 | Miller | 426/477 X |
| 3,017,050 | 1/1962 | Barr et al. | 215/247 |

*Primary Examiner*—Travis S. McGehee
*Attorney, Agent, or Firm*—Cennamo Kremblas & Foster

[57] ABSTRACT

A system and apparatus for the production of sparkling wine or other similar beverages by applying carbon dioxide to wine already bottled. Specifically a new and improved high pressure cap-type enclosure for the bottle permits the carbon dioxide to be applied through the cap with an applicator in the nature of a hypodermic needle.

Upon removal of the applicator the cap self-seals itself at a high pressure and retains and holds for an indefinite time the carbon dioxide. An exact pressure of carbon dioxide is applied to the bottled wine in an amount that closely approximates the pressures of champagne. The sparkling wine may thereafter be aged without deterioration of the cap and hence without loss of pressure.

4 Claims, 3 Drawing Figures

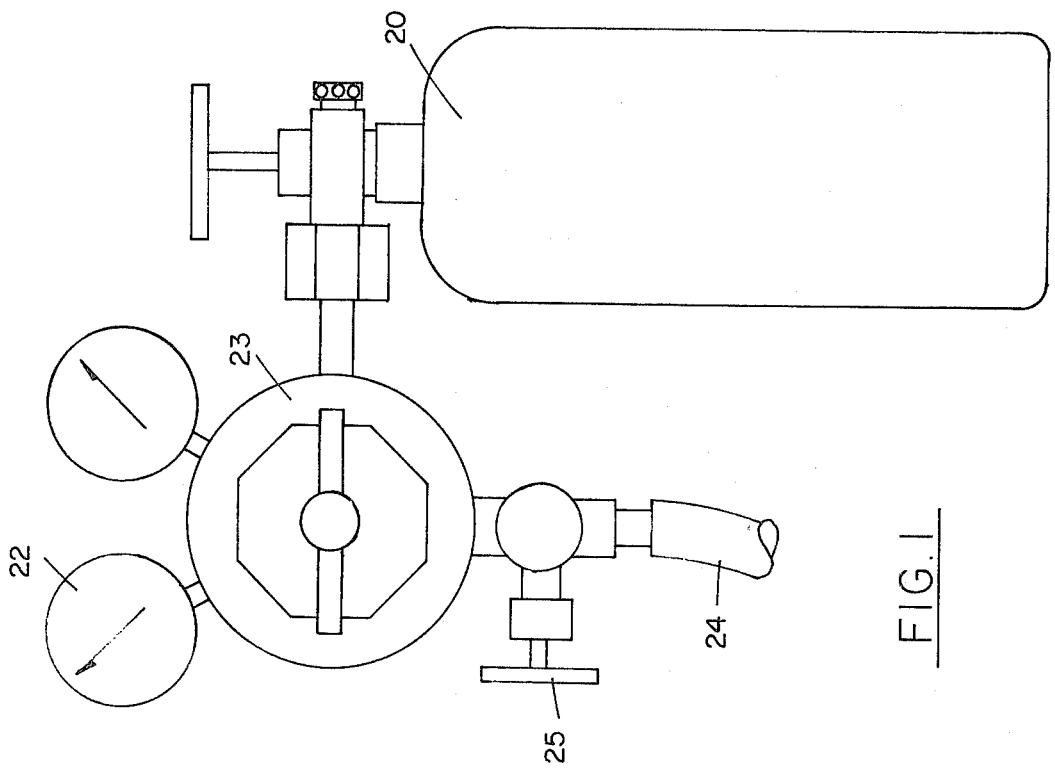
FIG.1
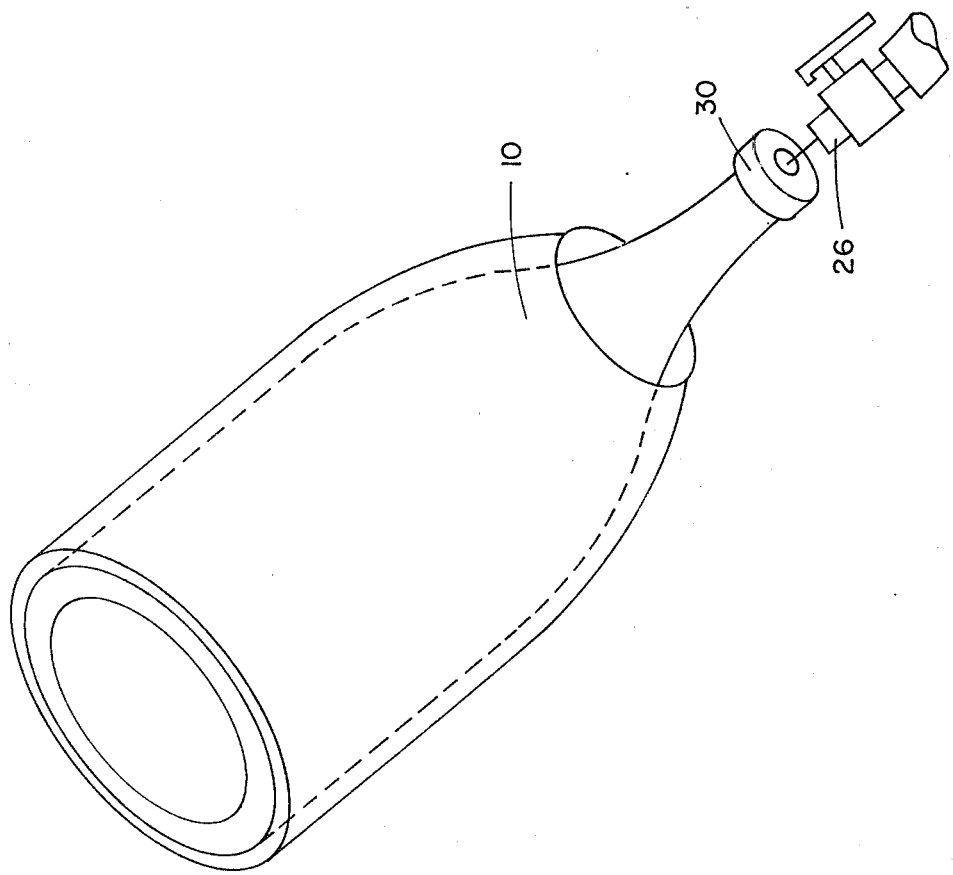

SYSTEM AND APPARATUS FOR THE PRODUCTION OF SPARKLING WINE

BACKGROUND

Sparkling wines and similar beverages are generally produced by the classical method of bottling wine before the fermentation has been completed. The fermentation process of the wine is thereafter completed in the bottle or to undergo a second fermentation in the bottle. In this way champagne or a similar beverage of highest quality is produced; but the method is extremely troublesome and highly expensive. During fermentation in the bottle the grape sugar, or sugar added to the wine, is converted into alcohol and carbon dioxide and the presence of the latter causes a relatively high pressure, for instance, up to 6 atmospheres or more may be built up within the hermetically closed bottle. This amounts to 90 pounds per square inch. The danger of explosion constitutes a very serious problem in handling these bottles during the fermentation process. In spite of all precautions that may be taken accidents may occur that not only result in a loss of the product and the bottle, but also affect the workmen employed.

Many manufacturers of sparkling wines and similar beverages are now employing a process wherein the wine concludes fermentation or undergoes a second fermentation — not in bottles — but in large sealed vats or containers. Although this method provides a less expensive similar procedure with the danger minimized, the final product is of relatively inferior quality. Many countries have enacted laws to prohibit the sale of these products under the name of "champagne", thus reserving this name only and exclusively for the high quality wines produced by the classical process in bottles.

There is further suggested in the prior art the application of carbon dioxide to a vessel containing a beverage of the fruit juice or carbonated types. These prior suggested methods each have their own failings — the most significant being the loss of the carbon dioxide once the applicator is removed. The loss of pressure is primarily attributed to the cap having a permanent hole left therein once it is punctured, or the use of material that deteriorates with time. The process cannot be adapted to wine that requires greater pressures by many orders of magnitude and thereafter aging. The state of the art of the cap or the seal for the container or vessel of the alcoholic beverage has not advanced to accommodate a sparkling wine process.

SUMMARY OF INVENTION

Carbon dioxide is applied to wine already bottled at a pressure similar to that of champagne. The pressure cap is of a permanent seal type with a rubber center that permits injection of the carbon dioxide with the use of a hypodermic needle type of applicator. Upon the removal of the applicator the cap reseals itself.

With the present invention the sparkling can be made any time after fermentation is completed (usually 3 to 6 months). The wine may be blended with other wines, sugared if necessary, stabilizer added, and then sparkled. The finished sparkling wine can be used immediately or kept for months for later use. In this way there is eliminated the guess work of blending before fermentation takes place. No "bad batches" are chanced because the final taste is known before sparkling, and this taste can be changed to suit the wine finisher himself. Sparkling wines of different dryness can be made from the same finished wine just by adding different amounts of sugar and/or brandy as is done in champagne making.

OBJECTS

The principal object of the present invention is to provide apparatus wherein wine already bottled may be converted into a sparkling wine;

wherein the dangers of explosion are lessened by utilizing the apparatus in a process at a distribution point;

and it is a further object of the present invention to provide such a process that produces a sparkling wine of superior quality and with a controlled flavor and pressure;

and which sparkling wine will retain its superior quality for an indefinite period of time.

Other objects and features of the present invention will become apparent from the following detailed description when taken in conjunction with the drawings wherein:

BRIEF DESCRIPTION OF DRAWINGS

FIG. 1 illustrates the overall process of applying carbon dioxide to a bottled wine.

DETAILED DESCRIPTION OF DRAWINGS

Figure 2:
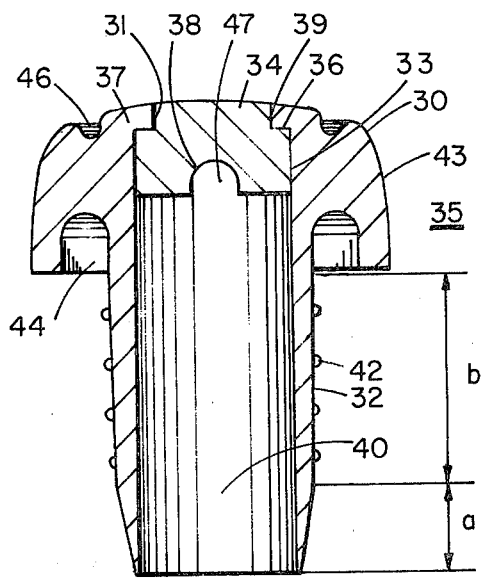
FIG. 2 is a cross-sectional view of the cap enclosure for the bottled wine.

With particular reference to the drawings there is shown diagrammatically the system of the invention in a preferred embodiment as applied to bottled wine. That is, the system is for charging the wine with carbonic acid gas — carbon dioxide, without disturbing the seal of the bottle.

The champagne bottle or high pressure container 10 is filled in a conventional manner with wine and sealed with the cap 30. The seal or cap 30 is in accordance with the present invention of the resilient plastic type such as polyethylene. The cap 30 is modified to provide a self-seal as hereinafter set forth.

With the sealed bottle the source of carbon dioxide 20 is utilized via hose 24 and hypodermic type needle 26 to puncture the cap to force a given amount of carbon dioxide gas to the wine in the bottle. The amount is determined by the pressure regulator 23 and on-off valve 25 as indicated by the pressure gauge 22. Once the carbon dioxide applied to the bottled wine is at the desired pressure as indicated by gauge 22 the needle applicator is removed.

In actual application of carbon dioxide to bottled wine a pressure of 90 pounds per square inch equal to 6 atmospheres — similar to that of natural champagne — was applied. It was found that the commercially available wine bottles are not of a sufficient thickness to withstand the pressure. Accordingly, only champagne type or other heavy gauge type of bottles should be used.

The wine in bottling is blended to suit the user's taste. The blending in addition to the various wines generally includes the addition of a small amount of brandy and sugar, otherwise the resultant sparkling wine would be too "dry" to most consumers. The sugar also forms a certain amount of carbon dioxide. Therefore, if sugar is added a stabilizer should be added to prevent further fermentation.

A commercially available 25 gauge, ⅝ inch long hypodermic needle as shown at 26 was utilized as the carbon dioxide applicator. It must be appreciated that other applicators could be used equally as well. The needle was caused to pierce the rubber center of the cap 30. The pressure valve 25 was turned on and the pressure regulator 23 was turned until the pressure gauge read in the order of 90 pounds per square inch pressure. The carbon dioxide was applied for a period of time varying from 2 to 5 minutes. The time being determined by visual inspection of the bubble section.

To increase the dissolving action of the carbon dioxide in the bottled wine the bottle was inverted and slowly swirled or agitated. That is, inverting and agitating the bottled wine during charging increases the amount of carbon dioxide dissolved in the wine. In a single bottle operation this may be done manually; but, in a commercial process mechanical agitation and inverting means of conventional design and operation may be utilized.

The probability of an exploding bottle or accident is very minimal, however, for safety the bottled wine should be encased in a heavy gauge material sleeve. A rubber automobile tire inner tube is excellent for this purpose. Also to further add to safety a welder's mask and a protective glove should be used.

When the bubbling is no longer visible, that is when a sufficient amount of carbon dioxide is applied to the bottled wine through the needle applicator 26, the needle applicator 26 is removed. The cap 35 reseals itself and the pressure is maintained within the wine bottle for extended and indefinite periods of time.

Figure 3:
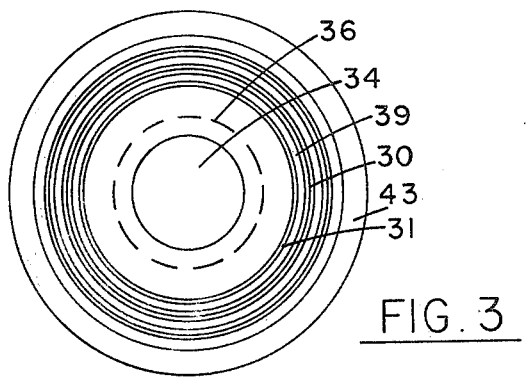
FIG. 3 is a top view of the cap enclosure of FIG. 2.

With reference to FIGS. 2 and 3 and particularly to the cross-sectional view of FIG. 2 there is seen the modified sealing cap 35 that makes the system of the present invention feasible. Specifically the sealing cap 35 is of resilient material such as polyethyline modified with a resealing uppermost portion 34. The indentation ring 46 provides strength to the cap when forced into the bottle neck. The side wall 43 overhangs the outside of the tubular member 32 to provide an outside seal. The overall cap 35 comprises an elongated tubular member 32 — the hollow area being designated as 40. The outside wall of the tubular member 32 in its lowermost region $a$ is of a diameter less than the inside diameter of the more or less standard champagne bottle neck. The outside wall of the tubular member 32 in the region from area $a$ upward to the upper structure designated as region $b$ is of a diameter substantially the same as that of the inside diameter of the bottle and slightly larger to maintain an air-tight fit. The hollow portion of the cap 40 is in the preferred embodiment, ⅛ of an inch narrower at the top diameter 33 than it is at the bottom area $a$. Additionally there is added — generally molded directly into — the outside wall of 32 a bead 42. This bead 42 should be circular.

In that the overall structure is of a resilient material the tubular member 32 can be "forced" into the bottle neck. Thereafter the resilient material and the bead 42 inherently pushing outwardly will seal the bottle. The cap may be removed and reused.

Through an aperture and resting in an uppermost hollow portion 40 of the cap 35 is the sealing material 34. This sealing material is of the resealing type of rubber or synthetic material wherein a hole caused by a puncturing tool will immediately close to maintain an air tight seal of the bottle.

To form the resealing cap an aperture is made in the centermost region of the top 37. The aperture may be made by centering and then drilling of the soft material. The uppermost portion 39 of the sealing material 34 is caused to protrude through the aperture. To assure a seal fit, the aperture in the top 37 is of a diameter less than the outside diameter of the seal portion 39. In this way once the sealing material 39 is forced into the opening it will grip the outer periphery of the aperture.

The cross-sectional diameter of the aperture 31 is of a size smaller than the diameter of the hollow of the cap 35. In this way the sealing material shoulder at 33 abuts the underside of the top 37.

In the construction of the cap the sealing material 34 is of a sufficient diameter to be small enough to insert in the hollow of cap 35 but yet large enough that once inserted becomes an air-tight press fit. The overall seal 34 is forced upwardly into the hollow 40 until the end 39 protruder through the aperture in top 37 and shoulder 36 abuts the underside of top 37.

It can be appreciated that the pressure in the bottle will tend to force the sealing material 34 upperward thereby compressing the sealing material to maintain it in place and to assist in a seal-tight fit.

The indention 47 provides additional resiliency to the seal and reduces the longitudinal diameter of the seal 34 for purposes of penetration of the applicator.

To assure that the cap 35 does not "work" its way out the overall cap structure may be twist wired as is done in conventional champagne bottles.

Several cases of wine were "carbonized" in accordance with the invention and after many weeks the bottles were opened with the conventional champagne "pop". The wine — initially a good quality — was enhanced further in flavor and resembled very closely a good quality champagne.

Although a certain specific apparatus and method is shown and described it is to be understood that modifications may be had without departing from the spirit and scope of the invention.

What is claimed is:

1. The combination of apparatus for carbonizing wine bottled in a bottle of the neck-type comprising:
   a cap having an elongated portion of an outside diameter substantially the same size as the diameter of the bottle neck,
   an upper portion joining said elongated portion having a greater cross-direction configuration to overlap the top of the neck of said bottle,
   a side wall for said top portion extending downwardly from said upper portion and overhanging the adjacent outside of said elongated tubular portion,
   said upper portion of said cap having an aperture formed therein of a size somewhat less than the inside diameter of said tubular elongated part, and,
   a self-sealing material positioned in the inside tubular elongated portion of said cap and abutting the periphery of said aperture and the inside wall of said elongated portion of said bottle;
   said elongated portion of said cap when fitted into said bottle neck and said side wall for said top portion overhangs the uppermost portion of said bottle neck, thereby providing a pressure air-tight fit of said cap on said bottle;
   a cource of carbon dioxide, a needle-type applicator and a hose connecting said applicator to said source of carbon dioxide.

said self-sealing material adapted to receive said needle to apply said carbon dioxide through said needle to said wine means for inverting and agitating said bottled wine while applying said carbon dioxide;

regulating means connected to said source for controlling the amount of carbon dioxide, applied to said bottled wine, said self-sealing material to again seal said bottled wine when said applicator needle is removed.

2. The system of claim 1 wherein said self-sealing material is in a seal-tight fit with said resilient capping means to provide a pressure-tight cap for said bottled wine.

3. The system of claim 1 wherein said carbon dioxide applied to said bottled wine is in the order of 90 pounds per square inch.

4. The system of claim 1 wherein said bottled wine comprises a blend of wine and a stabilizer to prevent further fermentation.

* * * * *